(12) United States Patent
Erland

(10) Patent No.: US 6,211,941 B1
(45) Date of Patent: Apr. 3, 2001

(54) MATTE PROCESS FOR COMPOSITE PHOTOGRAPHY

(76) Inventor: Jonathan Erland, 6026 Hayes Ave., Los Angeles, CA (US) 90042

( * ) Notice: Subject to any disclaimer, the term of this patent is extended or adjusted under 35 U.S.C. 154(b) by 0 days.

(21) Appl. No.: 08/901,117

(22) Filed: Jul. 28, 1997

Related U.S. Application Data

(62) Division of application No. 08/729,630, filed on Oct. 10, 1996, now Pat. No. 5,897,413.
(60) Provisional application No. 60/004,996, filed on Oct. 10, 1995.

(51) Int. Cl.[7] .................................................. G03B 19/18
(52) U.S. Cl. .............................. 352/45; 352/49; 352/89; 352/46; 352/47; 442/130
(58) Field of Search .................................. 430/368, 367; 8/648; 442/130; 428/913; 352/45, 46, 47, 89, 49

(56) References Cited

U.S. PATENT DOCUMENTS

| | | | |
|---|---|---|---|
| 1,273,435 | * | 7/1918 | Williams . |
| 1,613,163 | * | 1/1927 | Dunning . |
| 1,836,529 | * | 12/1931 | Eckert et al. . |

(List continued on next page.)

OTHER PUBLICATIONS

American Cinematographer Manual, 7th ed., pp 430–466, 1994.*
Luminescent Materials (Fluorescence Daylight); Reprinted from Kirk–Othmer: Encyclopedia of Chemical Technology, vol. 14, 3rd ed., pp 546–569, 1981.*
Day–Glo Daylight Fluorescence Color Specification System; Ward, Switzer Brothers, Inc., 1952.*

(List continued on next page.)

Primary Examiner—Terrel Morris
Assistant Examiner—Cheryl Juska
(74) Attorney, Agent, or Firm—Liu & Liu LLP

(57) ABSTRACT

The present invention provides a matte process employing an improved backing screen having particular application for use in composite photography. In particular, the present invention relates to color difference composite photography, whether still, motion picture, video, solid state digital electronic or electrophotographic imaging, in which foreground and background scenes are separately recorded and subsequently combined using known "blue screen" or special color background techniques to form a single image. The present invention includes a biaxially stretchable fabric of synthetic fibers treated with a dye formulation, including fluorescence which is reactive to the visible spectrum, to achieve any of a variety of specific spectral loci and luminances, for the purpose of providing a precise chromatic actinic stimulus response for a silver halide photographic film, or similar response for electronic imaging devices. The selected backing is deployed in a support such that the fabric is stretched to a smooth, featureless surface and then illuminated. Foreground subject matter interposed between the camera and the backing or directly on the backing will therefore be readily distinguished and "matted" for compositing by methods well known to the art. In a further aspect of the present invention, the light emitting characteristics of the fluorescent matte fabric of the present invention may be advantageously relied upon to obtain the desired lighting effect in, for example, underwater photography. In yet another embodiment of the present invention, the matte fabric of the present invention may be configured to cover objects or parts of a person in a field of view.

18 Claims, 13 Drawing Sheets

U.S. PATENT DOCUMENTS

| | | | |
|---|---|---|---|
| 2,024,081 | * | 12/1935 | Williams . |
| 2,417,384 | * | 3/1947 | Switzer . |
| 2,498,592 | * | 1/1950 | Switzer . |
| 2,693,126 | * | 11/1954 | Pohl . |
| 2,740,712 | * | 4/1956 | Pohl . |
| 3,014,041 | * | 12/1961 | Hausermann et al. . |
| 3,158,477 | * | 11/1964 | Vlahos . |
| 3,595,987 | * | 7/1971 | Vlahos . |
| 3,725,704 | * | 4/1973 | Buchanan et al. . |
| 4,007,487 | | 2/1977 | Vlahos . |
| 4,007,497 | * | 2/1977 | Vlahos . |
| 4,100,569 | * | 7/1978 | Vlahos . |
| 4,234,907 | * | 11/1980 | Daniel . |
| 4,344,085 | * | 8/1982 | Vlahos . |
| 4,352,861 | * | 10/1982 | Von Meer et al. . |
| 4,409,611 | * | 10/1983 | Vlahos . |
| 4,417,791 | * | 11/1983 | Erland et al. . |
| 4,548,470 | | 10/1985 | Erland . |
| 4,548,740 | * | 10/1985 | Erland . |
| 4,589,013 | * | 5/1986 | Vlahos et al. . |
| 4,625,231 | * | 11/1986 | Vlahos . |
| 4,629,298 | * | 12/1986 | Trumbull et al. . |
| 5,541,047 | * | 7/1996 | Kashiwagi et al. . |

OTHER PUBLICATIONS

Yorkshire Pat–Chem Inc. Technical Bulletin Re: "Rotary Dye Machines; Garment Dying Procedure; Fluorescent Pigments", 1995.*

American Cinematographer Manual, 7th Ed. pp 430–466, Jan. 1994.

Luminescent Materials (Fluorescence Daylight) ; Reprinted from Kirk–Othmer: Ency. of Chemical Tech., vol. 14, 3rd Ed. (1981) ; pp 546–569.

Day–Glo Daylight Fluorescence Color Specification System, Ward, Switzer Brothers, Inc. (1952).

Yorkshire Pat–Chem Inc. Technical Bulletin Re: Rotary Dye Machines; Garment Dying Procedure; Florescent Pigments (May 1995).

* cited by examiner

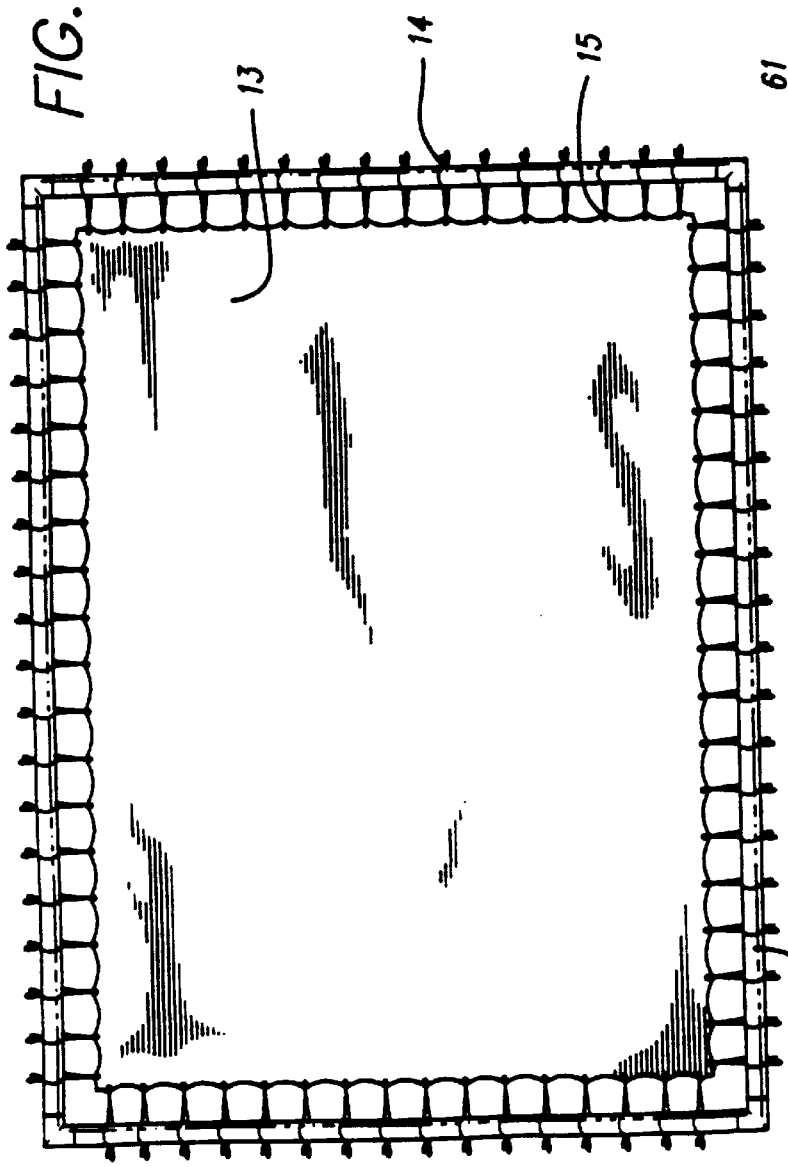
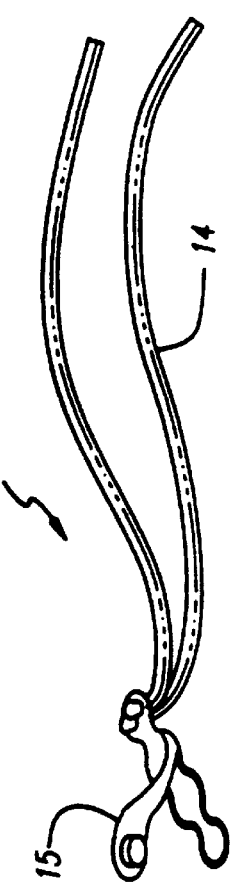

MATTE PROCESS FOR COMPOSITE PHOTOGRAPHY

This application is a divisional of application Ser. No. 08/729,630, filed Oct. 10, 1996 now U.S. Pat. No. 5,897,413, which is based upon U.S. Provisional Application, Ser. No. 60/004,996, filed Oct. 10, 1995, upon which priority is hereby claimed.

BACKGROUND OF THE INVENTION

1. Field of Invention

The present invention relates to composite photography, and more particularly to a matte process employing backing screens having improved chromatic actinic stimulus for color difference composite photography, cinematography, videography and solid state digital imaging.

2. Art Background

In motion picture production, it is often impractical, impossible or simply uneconomical to place actors in the specific environments to be depicted. To resolve this problem, various techniques have evolved over the years to composite such scenes from separately filmed "elements." The patent literature contains a great deal of teaching in this field. A comprehensive discussion is to be found in my prior patents. See U.S. Pat. Nos. 4,417,791, 4,548,470 and especially 4,629,298. Reference is also made to the *American Cinematographer Manual, Seventh Edition* (hereinafter "the ASC Manual"), pp. 430–466, with particular emphasis on the section titled "Screen Types and Lighting" pp. 434–437. With these references in mind, the present discussion will be confined to a summary of the evolution of traveling matte technique.

The earliest efforts at composite photography generally resorted to animation, as in Georges Méliès' "Trip to the Moon" (1902). Thereafter, techniques such as the "held/take" process were utilized, in which a scene was shot with predetermined areas of the successive frames blocked off with an opaque "matte" in order to preclude exposure thereof. The unexposed portions of the successive frames were thereafter exposed to the desired foreground subjects, with the background areas "matted" to protect the previously recorded latent images. Essentially the same process is used to incorporate a painting which depicts a distant, dangerous, or totally alien scene against which the actors are to appear; this is known as matte painting. In order to depict actors or other foreground subjects moving in front of the desired background scenes, it became necessary to produce "mattes" that would change from frame to frame, or "travel." Various techniques were developed over the years to accomplish this.

Early processes relied upon contrast alone, the foreground action being filmed against a jet black backing and the resulting image being printed through several generations of high contrast film stock or alternatively, having the image chemically "intensified" until a matte was produced. One example of this technique is described in U.S. Pat. No. 1,273,435 to Frank Williams in 1918.

The results obtained by this technique were generally quite poor, due to the inevitable distortion produced by the multiple reversals or the intensification which result in "haloes" or "fringes" occurring between the scene elements. Efforts to address these problems led to the exploitation of the chromatic response of black and white photographic film and resulted in the Dunning-Pomeroy process (U.S. Pat. No. 1,613,163 to Carrol D. Dunning, 1927) and another Williams process (U.S. Pat. No. 2,024,081, Dec. 10, 1935). With the advent of color film recording, notably the Technicolor process, the chromatic based systems began to proliferate. (See U.S. Pat. Nos. 2,693,126, and 2,740,712 to W. E. Pohl.).

The fundamental concept that makes it possible to derive a matte from a polychromatic photographic image is based on the fact that the superimposition of positive and negative images will cancel each other out and yield an opaque image. Thus it follows that if a given portion of the image is comprised of a pure monochromatic object, e.g., blue, this portion will appear as light in a print of the film record that is sensitive to blue and dark in prints of the film records that are not sensitive to blue, i.e. the red and green records. Therefore, if the red negative record, in which the "blue" object appears light, is superimposed with the blue positive record, in which the blue object also appears light, the blue object will remain the only significant "light" object in the scene, all polychromatic portions of the scene having canceled each other out to yield an opaque image. It is then straightforward to produce a set of positive and negative high contrast "mattes" and employ these to print, in succession, the foreground and background elements of a composite scene.

With the advent of monopak color photographic film it became possible to devise the ever more sophisticated color difference traveling matte techniques exemplified by Petro Vlahos' U.S. Pat. No. 3,158,477. As the compositing technology evolved to produce more convincing results, the requirements for the original photography of the "bluescreen" element became increasingly severe. Much ingenious attention was focussed on this area, and some of the results achieved have been recognized with patents and Academy of Motion Picture Arts and Sciences Scientific and Engineering Awards. Among these are: Eastman Kodak for color negative EC 5295, a film designed expressly for Bluescreen traveling matte photography (1987), the Stewart Traveling Matte Transmission Bluescreen backing (1964), the Blue-Max Blue Flux Front Projector (1984) (U.S. Pat. No. 4,629,298) and the Reverse Bluescreen Process (1983) (U.S. Pat. No. 4,417,791). The ultimate sophistication in traveling matte image acquisition is achieved with the Reverse Front Projection process described in the *American Cinematographer Manual,* p. 457, which solves a host of problems. This technique provides great control over chrominance and luminance and essentially cancels any prospect of "spill" and unwanted reflections.

The latest advances in compositing technology exploit the capacity of computer image manipulation processes and digital film scanning and printing techniques, and have vastly expanded the application and efficacy of composite photography. The catalogue of Petro Vlahos' patents in the field traces the development and increasing sophistication of electronic compositing. While the below listed patents describe the electronic hardware embodiments of the process, these have all now been implemented in computer software for digital electronic composites:

U.S. Pat. No. 3,595,987
U.S. Pat. No. 4,007,487
U.S. Pat. No. 4,100,569
U.S. Pat. No. 4,344,085
U.S. Pat. No. 4,409,611
U.S. Pat. No. 4,589,013
U.S. Pat. No. 4,625,231

In Ultimatte (Vlahos) matte extraction logic, as applied to digital film composites today, the process (while still quite similar), is freed from confinement to the Blue record and readily incorporates garbage and window mattes without any compromise of the finely detailed continuous tone feature.

The starting point for a digital blue or green screen color difference composite is a matte generated by subtracting the value of one color from the value of another for each pixel in the image. (Whether this is accomplished through software or through analog video circuitry, the net effect is the same.)

With Blue logic, the raw matte is a greyscale image whose value at each point is simply the amount by which Blue exceeds the higher of the other two colors. The result is a matte which is dead black anywhere Blue is less than Red or Green and some shade of grey wherever Blue is predominant primary color.

This matte is subjected to a variety of adjustments before it is used to process the foreground and background images, but the crucial point is that the matte is generated from the absolute levels of the color components for each pixel. A pixel having values of 200 Blue, 100 Green and 100 Red will yield a pixel with a value of 100 in the matte while a darker pixel of the same hue with values of 100 Blue, 50 Green and 50 Red will yield a matte value of 50.

In other words, the Ultimatte electronic or digital color difference matting process is a function of the luminance or brightness of the backing as well as the chrominance (hue) or purity of its color and the uniformity or consistency of the matte field.

What emerges quite clearly from this description of how the Ultimatte (and other comparable matte extraction programs) work is that chrominance (the purity of the backing color), luminance (the brightness of the backing color) and uniformity (the lowest possible variations in chroma and luminance) are all crucial to the process of creating a matte and to the subsequent composite image.

In 1992, Eastman Kodak Company developed an effective film digitizing scanner and a complementary film printing laser. These systems and others produced by different manufacturers provide extensive software programs covering every facet of compositing and image manipulation technique. It is now possible to create composites containing an infinite number of elements without any degradation of image quality from the original digital scan through to the laser film output. The most subtle image attributes can be retained, including extremely fine detail such as strands of hair, as well as the all important motion blurred edges of moving objects. Translucent objects such as glass, water and smoke may now be routinely rendered in totally convincing "seamless" composites.

The extremely high demands such sophisticated computer compositing programs make on original traveling matte photography can demonstrably be met by the previously described technology such as Blue-Max (R) front projection, Reverse Front Projection and the like. However, these techniques, as sophisticated in their way as the computer programs, are technologically complex and time consuming to employ. The immense proliferation of composite photography occasioned by the facility and efficacy of digital composite technology require the development of simple, effective and economical techniques for achieving the original image or "bluescreen element."

Throughout this discussion, the process has been described by the term "Bluescreen." This is explained by the fact that for most of the history of the process, the backing color of choice, and frequently of necessity, has been blue. While it is possible to perform photochemical optical traveling matte composites using any primary color backing, there has been a persuasive technological rationale for confining the process to the blue version. With the advent of the digital electronic processes described above, however, the range of backing colors is expanded to include all the primaries and indeed, their complements. Further, freed from the constraints entailed in the photochemical process, the advantages to be found in matting on the green record can now be readily accessed. A full discussion of the relative merits of blue versus green is not warranted here beyond the mention of some of the more obvious attributes involved.

In monopak color film, particularly that balanced for Tungsten light, the Blue sensitive record is, of necessity, comprised of a fast, and hence, grainier record than either Red or Green. This is due to the relative paucity of blue light available in the Tungsten spectrum. In fact, the film emulsion designers make a major effort to provide the green record with the highest possible image attributes. Thus many aspects of perceived image quality such as resolution, tone scale, acutance, and so on are delivered to the viewer via the green record of the monopak color film. (A similar situation also prevails in video imaging devices, where the bandwidth assigned to the respective color channels was derived from the visual response of the human eye; thus the Green channel is some 59%, versus approximately 30% for the Red and only 11% for the Blue.) In most photochemical compositing techniques, this attribute of the green record was superfluous, as the "matte" record, usually blue, was reduced to a high contrast black and white matte. By contrast, in a sophisticated digital electronic computer compositing system, the matte record is rendered as a continuous tone black and white image. Actually, the matte should no longer be thought of as an "image," but rather as a signals matrix containing the instructions for combining the relative proportions of both foreground and background picture elements (or pixels) which will comprise the eventual composite image. This is now known as the Alpha channel. For a comprehensive discussion of the Alpha channel, see "Compositing Digital Images," Thomas Porter and Tom Duff, in *Computer Graphics,* Vol. 18, No. 3, p. 254, Jul. 1984, in which the concept was introduced. Mattes produced using this technology are capable of readily reproducing the most subtle image attributes including translucent objects such as smoke and water, filmy fabrics, and, importantly, the edge blur of rapidly moving objects in the scene, as well as shadows. Such attributes were relatively much harder to render in photochemical optical composites, though by no means impossible, when a highly skilled practitioner of the art was involved.

The most significant issues noted above are those of "motion blur" and "shadows." In these situations the compositing system will be combining proportions of both foreground and background portions of the scene together. It is desirable that a shadow cast by the foreground scene onto the background matte field will retain enough image density to record in the Alpha channel, or matte, as a smooth quiet signal. The same is true for the reduced background signal occurring in the area of "motion blur" when a rapidly moving portion of the foreground subject is partially, though not completely, obscuring the background matte field. A great deal of filmed traveling matte footage is transferred to video via a telecine device, the leading such device in the industry being the Rank Telecine. This is essentially a flying spot scanner device employing a CRT source together with optics, such that a film image frame is scanned by the CRT "spot" whereby each pixel is coded into its component parts and stored as data. The device is handicapped by the fact that the CRT phosphors employed are essentially green in color, requiring excessive amplification of the relatively weak signal derived from the blue record of film. Thus the relative grainy record of Tungsten balanced negative film is exacerbated by the excessive electronic amplification resulting in what is termed "noisy" mattes. Quite obviously, deriving a matte signal from the fine grain green record of the same film illuminated by an essentially green phosphor CRT tube will produce an electronically very "quiet" matte.

Another, small advantage of matting on the green record is derived from the fact that the optics of the camera are designed mainly around the green portion of the spectrum and, assuming the camera has been properly focussed, the very best focus will occur for the green record, with very deep red objects suffering slightly by comparison.

Further discussion on the relative merits of Blue versus Green may be found in Ultimatte Technical Bulletin No. 2, "Green or Blue—Selecting a Backing Color for an Ultimatte Composite." (Published by the Ultimatte Corporation, manufacturer of Petro Vlahos' inventions previously referred to.) After a discussion of the many complex issues, the bulletin concludes, "There are no simple rules for specifying when to use a blue or green backing. Each situation must be analyzed to see whether a blue or a green backing will yield better results."

Among the simplest of techniques for achieving a blue-screen element is that of deploying a fabric backing of the appropriate chrominance and luminance and staging the scene before it. This, indeed, has been one of the principal methods employed for several years. When it is possible to isolate the lighting of the backing from the lighting of the foreground scene, it is possible to achieve excellent results. The author's developments of fluorescent light sources specific to the task (as cited in the ASC Manual, p. 435) and those of others in the field have greatly improved the results obtained by this approach. However, it is increasingly desirable to be able to place the foreground action directly in, or on, the backing. In this situation the same light will, of necessity, light both the backing and the foreground action. As the discussion on page 436 of the ASC Manual illustrates, the existing techniques employing fabrics of the prior art are far from effective. Painted backings and floors have yielded better results, as these have been possible to endow with enhanced properties versus fabric. The greatest success in this approach has been the employment of fluorescent pigments incorporated in both opaque and transparent paints, (some aspects of this discussion are described in U.S. Pat. No. 4,417,791), as these permit greater chromatic actinic stimulus for photographic film than do conventional pigments.

However, painted backings suffer the disadvantage of the relatively high cost of providing an appropriate substrate, the very high cost of the pigments required and the labor to apply them, as well as the inordinate time required for the whole operation. To obtain the efficacy of high quality painted backings with the simplicity, speed and economy of fabric backings requires the development of a new type of dyed fabric backing.

SUMMARY OF THE INVENTION

The present invention provides a matte process employing an improved backing screen having particular application for use in composite photography. In particular, the present invention relates to color difference composite photography, whether still, motion picture, video, solid state digital electronic or electrophotographic imaging, in which foreground and background scenes are separately recorded and subsequently combined using known "blue screen" or special color background techniques to form a single image. The present invention includes a biaxially stretchable fabric of synthetic fibers treated with a dye formulation, including fluorescence which is reactive to the visible spectrum, to achieve any of a variety of specific spectral loci and luminances, for the purpose of providing a precise chromatic actinic stimulus response for a silver halide photographic film, or similar response for electronic imaging devices.

The selected backing is deployed in a support such that the fabric is stretched to a smooth, featureless surface and then illuminated. Foreground subject matter interposed between the camera and the backing or directly on the backing will therefore be readily distinguished and "matted" for compositing by methods well known to the art.

In a further aspect of the present invention, the light emitting characteristics of the fluorescent matte fabric of the present invention may be advantageously relied upon to obtain the desired lighting effect in, for example, underwater photography. In yet another embodiment of the present invention, the matte fabric of the present invention may be configured to cover objects or parts of a person in a field of view.

Specifically, the present invention is directed to a matte process for composite photography utilizing a color difference process comprising the steps of providing a matte backing which comprises a fabric material treated with a dye formulation including fluorescence which is reactive to illumination with visible spectrum to achieve a spectral emission of a desired color and luminance for providing a desired actinic stimulus to an image recording medium; illuminating a foreground subject with a visible spectrum illuminant with the matte backing in place; exposing an image recording medium to the foreground subject and matte backing to form a representation of an image; and forming a matte from said representation of said image. The matte backing exhibits a spectral characteristic substantially corresponding to one of the optimal spectral loci of FIG. 1. The dye formulation may be formulated such that a negative that has exposure characteristics substantially similar to that of a Kodak EC 5293 negative, when exposed with the matte backing, exhibits relative optical densities in the negative substantially corresponding to one of the sets of bar graphs in FIG. 2. The dye formulation may comprise a first dye containing a first phosphor which is reactive to illumination within visible spectrum and having a dominant emission of a first wavelength within the visible spectrum The fabric material may be treated with the dye formulation to form a green matte, and wherein the first dye is Alberta Yellow dye and the absorption dye is phthalocyanine green dye. The absorption dye may comprise a second dye containing a second phosphor which is reactive to illumination within the visible spectrum and having a dominant emission of a second wavelength within the visible spectrum, and an adsorption dye which absorbs certain fluorescent emission from said first phosphor, wherein said second dye fluoresces in part by stimulus of the emission from the first phosphor. The absorption dye may comprise a third dye containing a third phosphor which is reactive to illumination within the visible spectrum and having a dominant emission of a third wavelength within the visible spectrum, wherein said third dye fluoresces in part by stimulus of the emission from the first and/or second phosphor. The fabric material may be treated with the dye formulation to form a red matte, and wherein the first dye is Alberta Yellow dye, the second dye is Rhodamine F5G dye and the third dye is Rhodamine B.

BRIEF DESCRIPTION OF THE DRAWINGS

FIG. 3A is a diagrammatic view illustrating a matte backing screen of the present invention deployed as attached to a frame; FIG. 3B illustrates a tie adapted for use to attach the matte backing screen to the frame.

DETAILED DESCRIPTION OF THE INVENTION

A matte proess employing an improved backing screen is disclosed having particular application for use in color difference traveling matte composite photography. In particular, the present invention relates to composite color photography, whether still, motion picture, video or solid state digital electronic imaging in which foreground and background scenes are separately recorded and subsequently combined, using known "blue screen" or special color background techniques, to form a single image. The present invention includes a biaxially stretchable fabric treated with a dye formulation, including fluorescence, to achieve any of a variety of specific spectral loci and luminances for the purpose of providing a precise chromatic actinic stimulus response optimal for silver halide photographic film, or similar response for electronic imaging devices.

Figure 1:
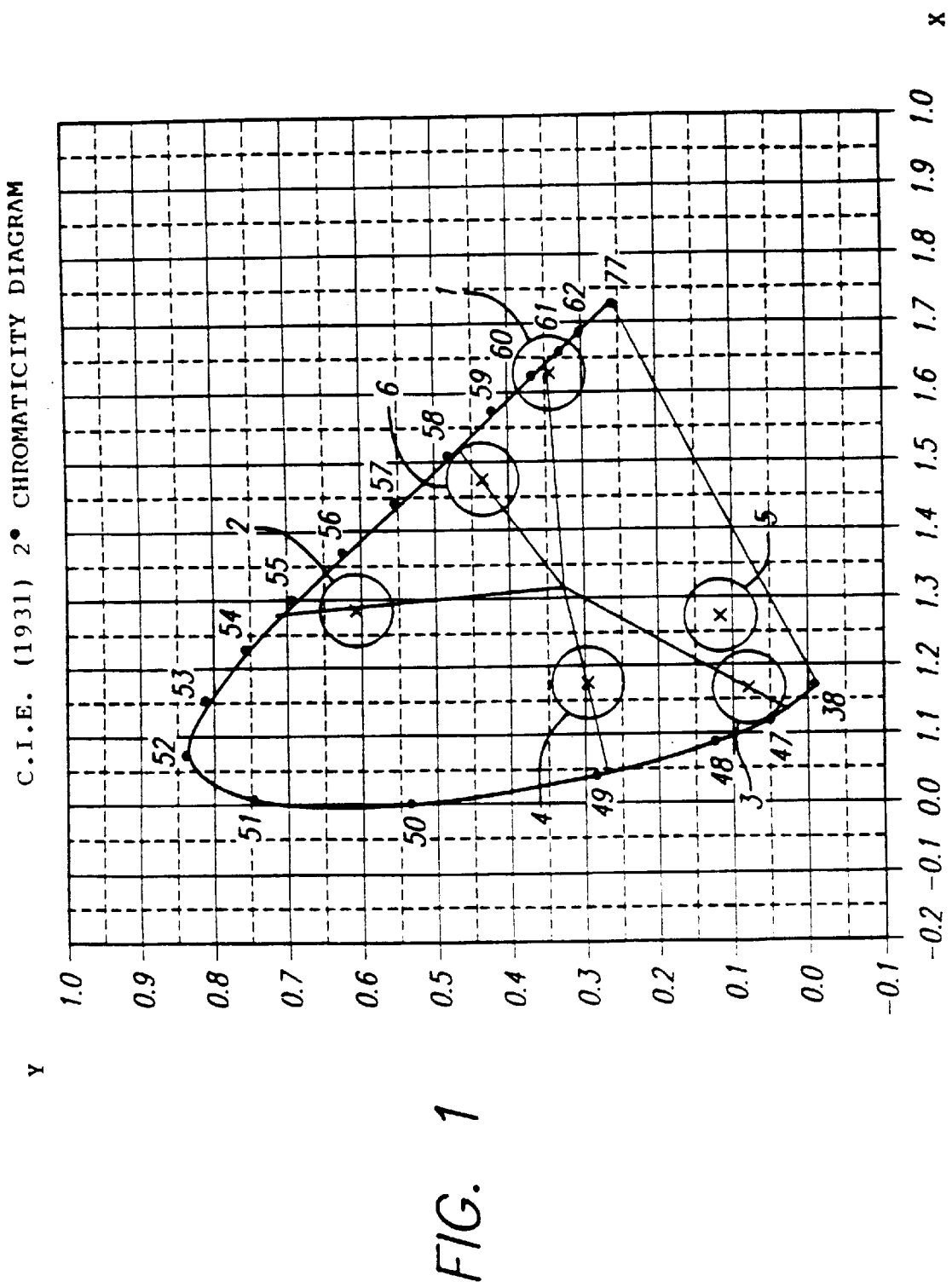
FIG. 1 illustrates a C.I.E. (1931) chart showing the chromaticity coordinates of the various optimal spectral loci of matte backings of the present invention.
Figure 2:
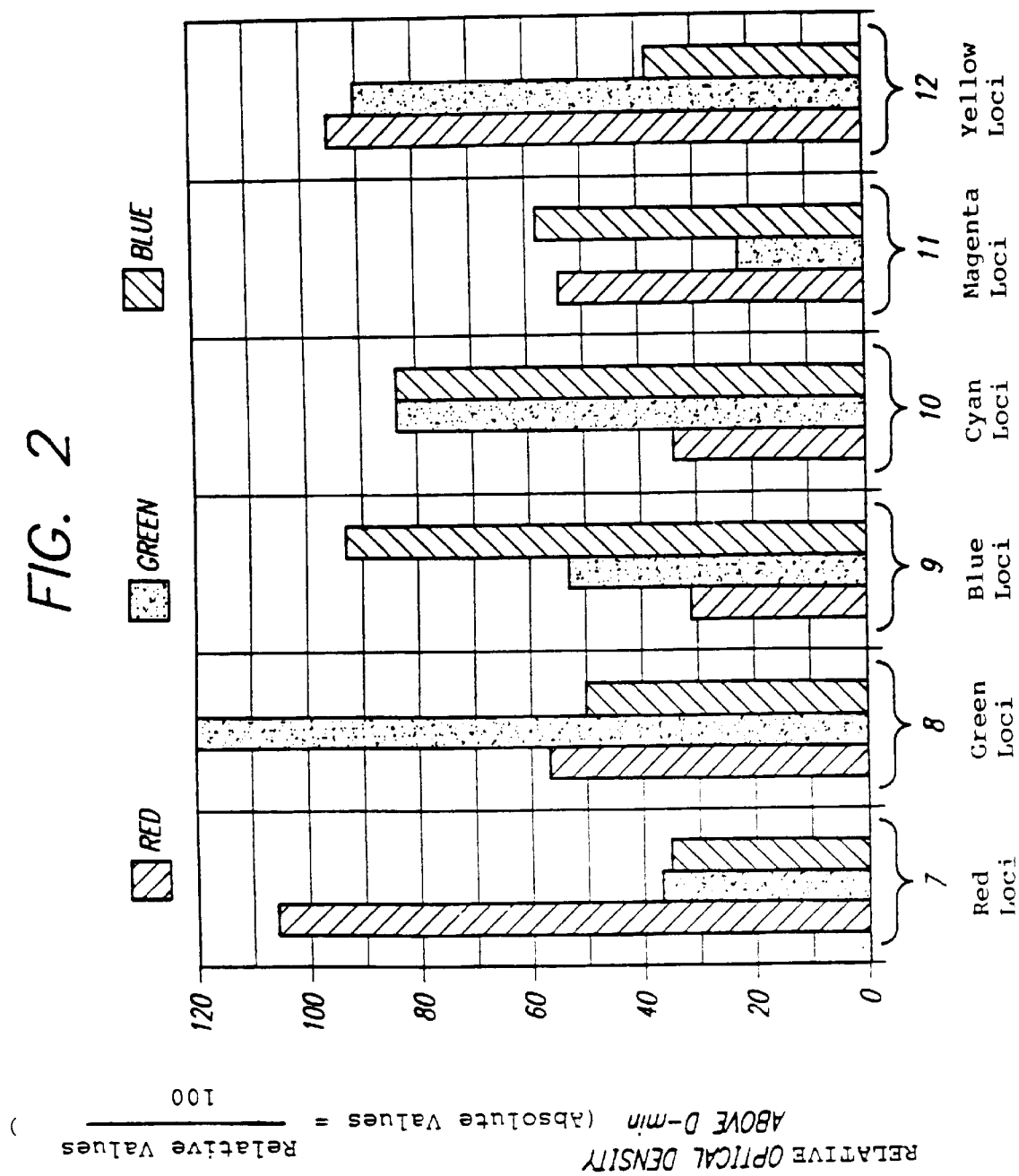
FIG. 2 illustrates several sets of bar graphs corresponding to the optical densities in the negative above D-min of Red, Green and Blue for Red, Green, Blue, Cyan, Magenta and Yellow loci in FIG. 1.

The optimal spectral loci can be designated as illustrated in FIG. 1 using C.I.E. (Commission Internationale de l'Eclairage) (1931) 2° Chromaticity coordinates, with C.I.E. Illuminant D65 as a reference, as follows (for additional discussion on C.I.E. standards, references are made to "Handbook of Colorimetry", prepared by Color Measurement Laboratory at Massachusetts Institute of Technology under the direction of Arthur C. Hardy, published by Technology Press, MIT (1936); and "Color Measurement—Theme and Variations" by D. L. MacAdam, Second Revised Edition, (1985):

Red locus 1 of FIG. 1 is represented as a circular area with a focal point located at coordinates $x=0.6300$ and $y=0.3450$ and with a radius of 0.06 of the C.I.E. scale, a dominant wavelength of 605 n.m., a purity of at least 80% and a luminance greater than 58%. When exposed to EC 5293 under Kodak LAD "laboratory aim density" standard conditions, a backing having these color characteristics produces densities (in accordance with ANSI/ISO 5/3-1984 Standards) in the negative above D-min of Red: 106; Green: 37; Blue: 35, as illustrated by graph 7 of FIG. 2.

Green locus 2 of FIG. 1 is represented as a circular area with a focal point located at chromaticity coordinates $x=0.2850$ and $y=0.6100$, having a radius of 0.06 of the C.I.E. scale, a dominant wavelength of 547 n.m., a purity of at least 60% and a luminance greater than 78%. When exposed to EC 5293 under Kodak LAD standard conditions, a backing having these color characteristics typically produces densities in the negative above D-min of Red: 57; Green: 120; Blue: 50, as illustrated by graph 8 of FIG. 2.

Blue locus 3 of FIG. 1 is represented as a circular area with a focal point located at chromaticity coordinates $x=0.1650$ and $y=0.0800$; having a radius of 0.06 of the C.I.E. scale; a dominant wavelength of 462 n.m.; a purity of at least 70%; and a luminance greater than 10%. When exposed to EC 5293, under Kodak LAD standard conditions a backing having these color characteristics produces densities in the negative above D-min of Red: 31; Green: 53; Blue: 93, as illustrated by graph 9 in FIG. 2.

Cyan locus 4 of FIG. 1 is represented as a circular area with a focal point located at chromaticity coordinates $x=0.1750$ and $y=0.3000$; a radius of 0.06 of the C.I.E. scale; a dominant wavelength of 488 n.m.; a purity of at least 25%; and a luminance greater than 30%. When exposed to EC 5293 under Kodak LAD standard conditions, a backing having these color characteristics produces densities in the negative above D-min of Red: 34; Green: 83; Blue: 83, as illustrated by graph 10 of FIG. 2.

Magenta locus 5 of FIG. 1 is represented as a circular area with a focal point located at chromaticity coordinates $x=0.2700$ and $y=0.1150$; a radius of 0.06 of the C.I.E. scale; a dominant wavelength of 560 n.m.; a purity of at least 52%; and a luminance greater than 25%. When exposed to EC 5293 under Kodak LAD standard conditions, a backing having these color characteristics produces densities in the negative above D-min of Red: 54; Green: 22; Blue: 58, as illustrated by graph 11 in FIG. 2.

Yellow locus 6 of FIG. 1 is represented as a circular area with a focal point located at chromaticity coordinates $x=0.4750$ and $y=0.4400$; a radius of 0.06 of the C.I.E. scale, a dominant wavelength of 582 n.m.; a purity of at least 60%; and a luminance greater than 80%. When exposed to EC 5293 under Kodak LAD standard conditions, a backing having these color characteristics produces densities in the negative above D-min of Red: 95; Green: 90; Blue: 38, as illustrated by graph 12 in FIG. 2.

It is noted that the values of the negative densities noted above are intended to demonstrate the relative densities between red, green and blue components. Deviations from the noted values should not affect the present invention, as long as the relative densities are substantially within the same order of magnitude without departing from the scope and spirit of the present invention.

The selected backing is deployed in a support such that the fabric is stretched to a smooth, featureless surface and is then illuminated. Foreground subject matter interposed between the camera and the backing or directly on the backing will therefore be readily distinguished and "matted" for compositing by methods well known to the art. Such methods include, but are not limited to, those identified in the Background section herein, which are fully incorporated by reference herein. In particular, without limitation, the matte process disclosed in Petro Vlahos' U.S. Pat. Nos. 3,595,987; 4,007,487; 4,100,569; 4,344,085; 4,409,611;

4,589,013; and 4,625,231, and the U.S. Pat. Nos. 4,417,791; 4,548,470 and 4,629,298 issued to the inventor of the present invention are fully incorporated by reference herein. Given the teachings of the present invention, one skilled in the art can implement these methods using the matte fabric and dye disclosed herein.

It is noted that for the Cyan, Magenta and Yellow (complementary colors) matte backings of the present invention, the matte process of the prior art would need to be inverted. More particularly, with Yellow (inverse of Blue) logic, the raw matte is a greyscale image whose value at each point is simply the amount by which Blue is lower than the lower of the other two colors. The result is a matte which is dead black anywhere Blue is more than Red or Green and some shade of grey wherever Blue is the lowest primary color. With Magenta logic the raw matte is a greyscale image whose value at each point is simply the amount by which Green is lower than the lower of the other two colors. The result is a matte which is dead black anywhere Green is lower than Red or Blue and some shade of grey wherever Green is the lowest primary color. With Cyan logic the raw matte is a greyscale image whose value at each point is simply the amount by which Red is lower than the lower of the other two colors. The result is a matte which is dead black anywhere Red is more than Blue or Green and some shade of grey wherever Red is the lowest primary color.

Referring now to FIG. 3A, a fabric backing screen assembly 60 is illustrated. The fabric screen 13 is comprised, in a preferred embodiment, of a fabric known to the textile industry as a biaxially stretchable material consisting of approximately 90% nylon fiber at from 40 to 70 denier (a unit of fineness for silk, rayon or nylon yarn equal to the fineness of a yarn weighing one gram for each 9000 meters), and approximately 10% DuPont "Spandex" fiber at about 250–300 denier, the average weight being in the range of 6 to 12 ozs. per sq. yard. One example of such a fabric is manufactured by Darlington Mills and designated as Style 8050.

Ties 61 comprising lightweight cotton cords 14 of approximately eighteen inches in length are attached to the borders of the fabric screen 13 at intervals of approximately seven inches by "garter snaps" 15 (see also FIG. 3B). These ties 61 permit the screen 13 to be stretched into a suitable frame 62 which may be of an aluminum tubular design, wood, or the like. Once so deployed, the screen 13 exhibits an extremely smooth, flat, wrinkle-free surface, providing for a featureless image when photographed.

The use of this method of attachment avoids the conventional requirement for a hem in which are installed grommets to permit tying with cord. The rationale for this novel approach is that the stretchability of the fabric panel is not compromised by the hemming and grommetting operation, and further, that the ties can be readily detached from the fabric to permit laundering the fabric panel.

To achieve the high chrominance and high luminance desired for optimal matte performance, the fabric of the present invention is treated with specific dyes as required to provide either Red, Green, Blue, Cyan, Magenta or Yellow loci having the characteristics previously described in conjunction with FIG. 1. These dyes employ fluorescence as the mechanism by which to achieve the enhanced chrominance and luminance as specified. In particular, they employ a class of fluorescent dyes known as daylight-fluorescence which are capable of excitation by a broad spectrum of radiation from ultraviolet into the visible region. Thus, the need for supplemental filtered light specific to the backing screen is reduced or eliminated by the conversion mechanism of fluorescence whereby radiation of undesirable shorter wavelengths are absorbed and converted to the desired wavelength; i.e. blue and green light can be absorbed, converted and re-emitted as red light. For a more detailed background discussion relating to fluorescent materials, reference is made to the chapter on "Luminescent Materials (Fluorescent Daylight)" by Richard A Ward and Edward L. Kimmel, published in Kirk-Othmer: Encyclopedia of Chemical Technology, Vol. 14, 3rd Edition (1981). Further, U.S. Pat. Nos. 1,836,529; 2,417,384; 2,498,592 and 3,014,041, for examples, are instructional regarding fluorescent materials. Further reference is made to "The 'Day-Glo' Daylight Fluorescent Color Specification System" by Richard A. Ward of Switzer Brothers, Inc., Cleveland, Ohio (1952). The discussions in the aforementioned references set forth the state of the art in fluorescent materials, and they will not be repeated herein so as not to obscure the understanding of the present invention, but are instead fully incorporated by reference herein.

There are relatively few such fluorescent dyes to choose from, and these have to be manipulated in specific ways in order to produce the desired result. The effective phosphor for the green dye, for example, is actually the greenish-yellow coumarin dye Alberta Yellow (Solvent Yellow 135) with a dominant emission of 563.2 n.m. However it has strong emission from 530 n.m. through 560 n.m. It is therefore attenuated with the addition of a small amount (on the order of 2–6%) of phthalocyanine green dye which acts as an absorption filter to suppress the longer wavelengths below 560 n.m., yielding C.I.E. data as follows: x=0.2843, y=0.5676, a dominant wavelength of 545 nm.; and at least a luminance of 75%; and a purity of 60.32%.

It is noted that the specific resultant luminance peak (green in the foregoing example) becomes better defined as more absorption agent is added, but the overall luminance intensity may be decreased if too much absorption agent is added as the absorption agent inevitably also absorbs part of the source illuminant. It is therefore necessary to empirically adjust the amount of absorption agent to obtain the desired chrominance and luminance requirements. Given the disclosure of the present invention herein, it would not be difficult for one skilled in the art to accomplish this task without undue experimentation.

Figure 4A:
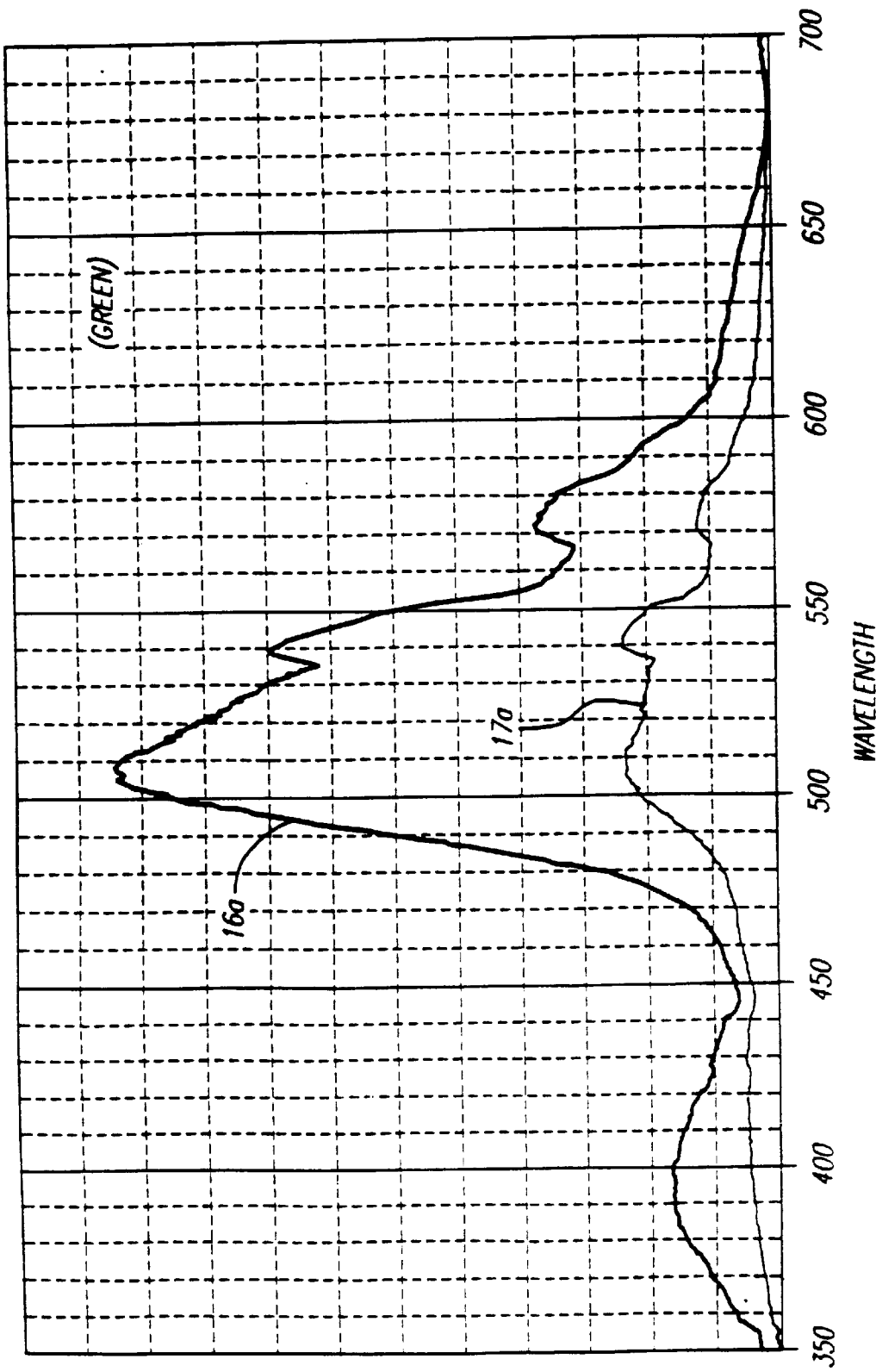
FIGS. 4A–C are graphs comparing the spectral reflectance of green, red and blue matte backings of the present invention and the prior art.

When illuminated by C.I.E. Standard Illuminant D65 (i.e. a daylight reference), an optimal exposure is recorded on motion picture film (or other recording device) in which the backing screen records as one and a half "stops" greater than a standard 18% photographic grey card illuminated by the same source. (A photographic "stop" represents a measure of the actinic speed of the photographic process, where the quanta of actinic radiation is doubled for each progressively larger stop. The speed of the photographic process can be affected by altering the quanta of radiation at the subject, the aperture of the lens at the camera, or the actinic sensitivity of the film or other sensor.) When read in a densitometer, the developed negative will typically show readings (above minimum density or D-Min) of Red: 58; Green: 120; and Blue: 50 and display the spectral reflectance traces shown in FIG. 4A, curve 16a. (It is noted that the traces shown in FIGS. 4A–C were obtained using illumination of "HMI" movie stage artificial daylight condition. While this HMI illumination is slightly different from the D65 illuminant, FIGS. 4A–C nonetheless illustrate the relative reflectance between the matte backings of the present invention and the prior art which are similar to traces otherwise obtained using D65 illumination.)

For comparison, the industry standard green fabric screen (i.e. "Tempo") analyzed under identical circumstances yields the following C.I.E. data: x=0.2874, y=0.5199; a dominant wavelength of 544.1 nm.; a luminance of 28.8%; and a purity of 47.61%. When illuminated by C.I.E. Standard Illuminant D65 (i.e. daylight), the industry standard fabric records as one half stop lower than a standard 18% photographic grey card illuminated by the same source. When read in a densitometer, the developed negative will typically show readings (above D-Min) of Red: 41; Green: 79; and Blue: 37, and display the spectral reflectance traces shown in FIG. 4A, curve 17a. Thus the backing screen of the present invention yields a substantial improvement in terms of density and color separation in the developed negative, and consequently greatly facilitates the processing of the matte signals. A very significant attribute of the present invention is that the two stop increase in photographic "speed" described above can quite readily translate into a reduction of seventy-five percent of the lighting apparatus normally required. The provision and operation of such apparatus constitutes a major expense in motion picture production, and reductions on scale of seventy-five percent result in very substantial savings.

For the Red screen version, a further manipulation is affected which exploits the ability to transfer energy from one fluorescent dye to another. Thus, the Alberta Yellow dye has added to it Rhodamine F5G (normally a "salmon" or slightly magenta orange). The result is that the emission from the Alberta Yellow is reabsorbed by the Rhodamine and added to the excitation already occurring by the Standard illuminant. However, the Alberta Yellow is meanwhile absorbing the blue violet component of the Rhodamine emission, thus canceling it from the total emission and adding it to the orange component.

To this arrangement, still another dye is introduced: Rhodamine B (Basic Violet 10) is normally, as its name suggests, a violet color with deep red and deep blue-violet components. The result is that the Rhodamine B now absorbs the emission of the previous combination again, in addition to that of the Standard Illuminant, while simultaneously having its blue-violet component absorbed and re-emitted in the 600 n.m. region (or red). All of these conversion and reconversion give rise to a cascading fluorescence effect which result in a very efficient emitter of red illumination having the appearance of being internally powered as in an electro-luminescent device.

Figure 4B:
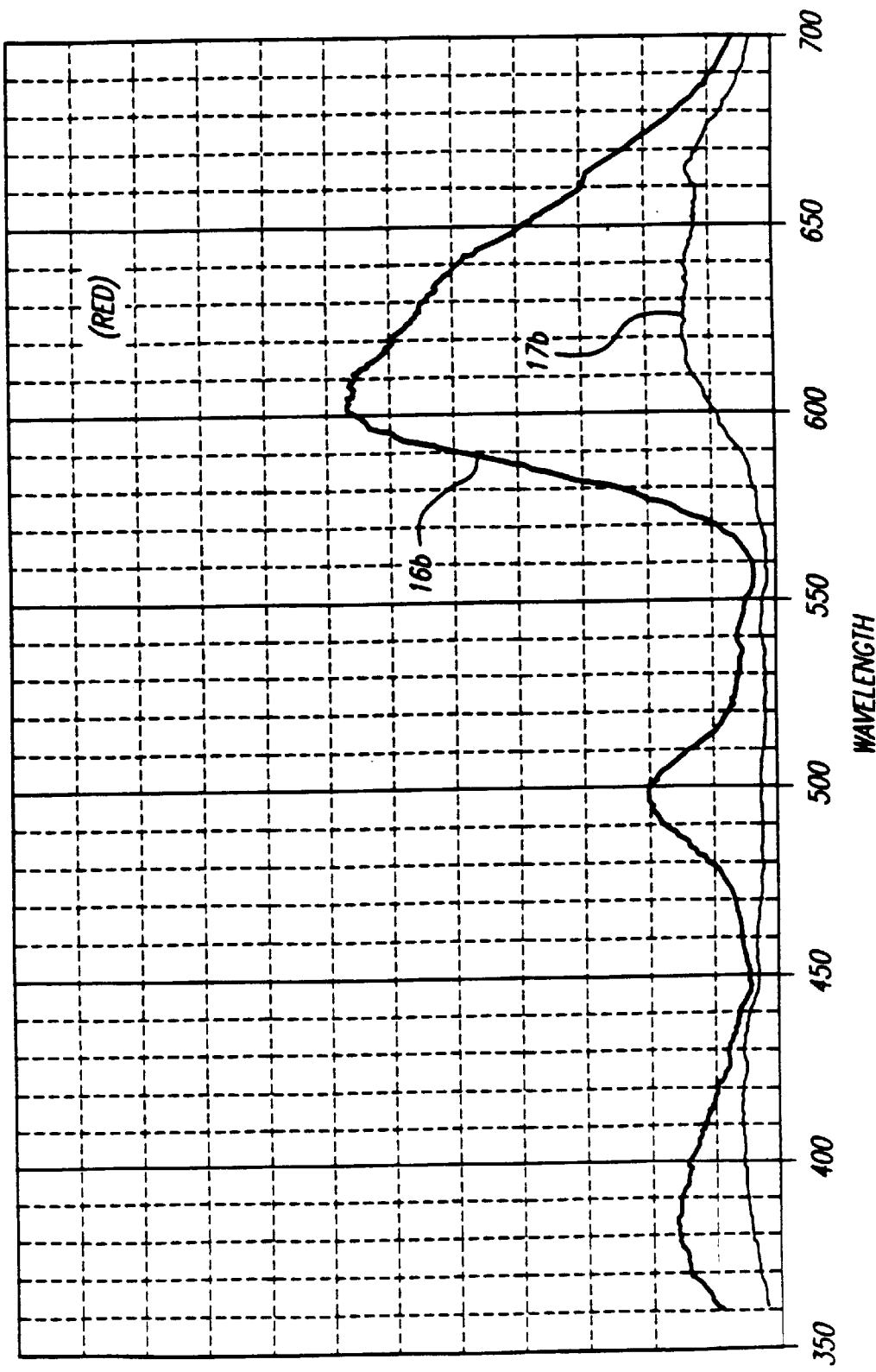

The spectral reflectance traces for the Red screen of the present invention (16b) and the prior art Red screen (17b) are shown in FIG. 4B.

For the Blue version, relatively less assistance is required from fluorescence, as an excessively high luminance in a Blue traveling matte backing will cause a phenomena known as "cyan undercut" which is believed to result from an interaction between the various emulsion layers comprising the color film and which expresses itself as a red fringing around foreground object details. An optimal Blue backing luminance is achieved at par with that of an 18% photographic grey card illuminated by the Standard Illuminant.

Figure 4C:
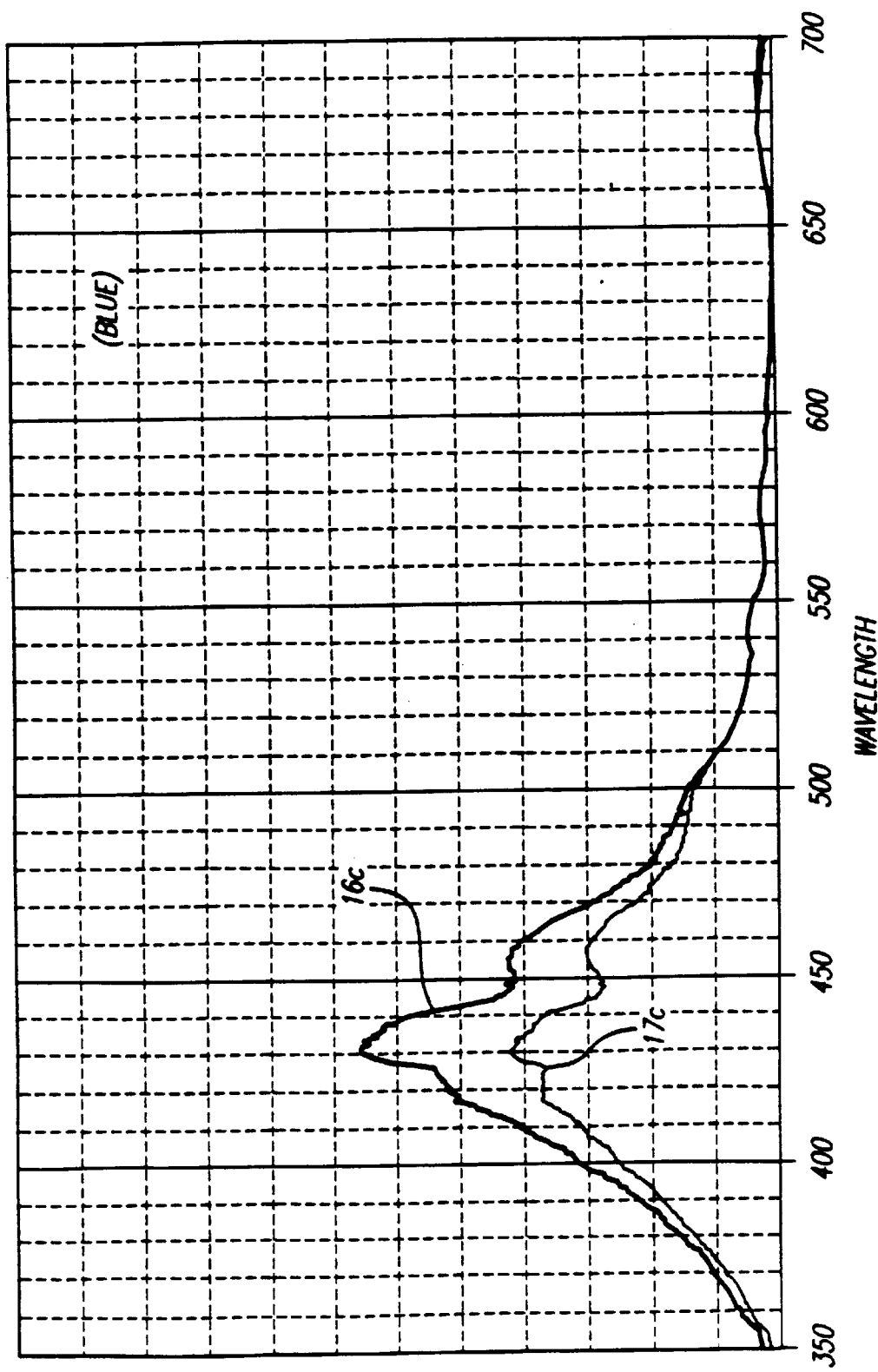

The spectral reflectance traces for the Blue screen of the present invention (16c) and the prior art Blue screen (17c) are shown in FIG. 4C.

Given the discussions above, similar processes may be undertaken to obtain the other color versions.

It is noted that the exact composition of the fluorescent dye may vary from batch to batch of the matte fabric dyed. Given the color and luminance requirements for a specific matte procedure and the state of the art in fluorescent dye, those skilled in the art will recognize from the foregoing description how to adjust the formulation of the dye mixtures to meet the desired chrominance and luminance requirements without undue experimentation.

The fabric is colored to achieve one of the previously described optimal chroma (color) and luminance (brightness) specifications by methods known to the textile dying industry as "total exhaust dying," representative of which is the following procedure from Yorkshire Pat-Chem, Inc.:

ROTARY DYE MACHINES GARMENT DYEING PROCEDURE FOR FLUORESCENT PIGMENTS

Record owf—dry weight of material to be dyed.
1. Set bath at 80° F. (approximately).
2. Add 0.25% owf* nonionic surfactant, low foamer preferred.
3. Heat to 180° F. and run for 10 minutes.
4. Drop and rinse at 80° F. for 2 minutes, drop.
5. Refill at 80°.
6. Add 4% owf diluted Pretreat SS-10 and run 5 minutes (while machine is in motion).
7. Heat to 140° F. and run 10 minutes.
8. Drop and rinse at 80° F. for two minutes.
9. Refill at 80° F. and add well-diluted dye slowly (while machine is in motion).
10. Run 5 minutes, begin heating to 160° F. (3–4/minute).
11. Run 10 minutes at 160° F.
12. Slowly add 0.5 to 1.0% owf acetic acid (well-diluted) and run an additional 10 minutes. Dye bath should be practically clear; if not, add additional acetic and run 5 to 10 minutes longer.
13. Drop and refill at 80° F.
14. Add 8% Aftertreat SS-30 (diluted) and heat to 120° F.
15. Run 10 minutes. Softener may be added halfway through this cycle.
16. Drop and rinse at 80° F. for 2 minutes.
17. Drop, extract, and tumble dry.

*Amount will vary according to strength of surfactant.

NOTE: For best results, liquor ratios should not be greater than 20:1 nor less than 15:1 in weight.

Figure 5:
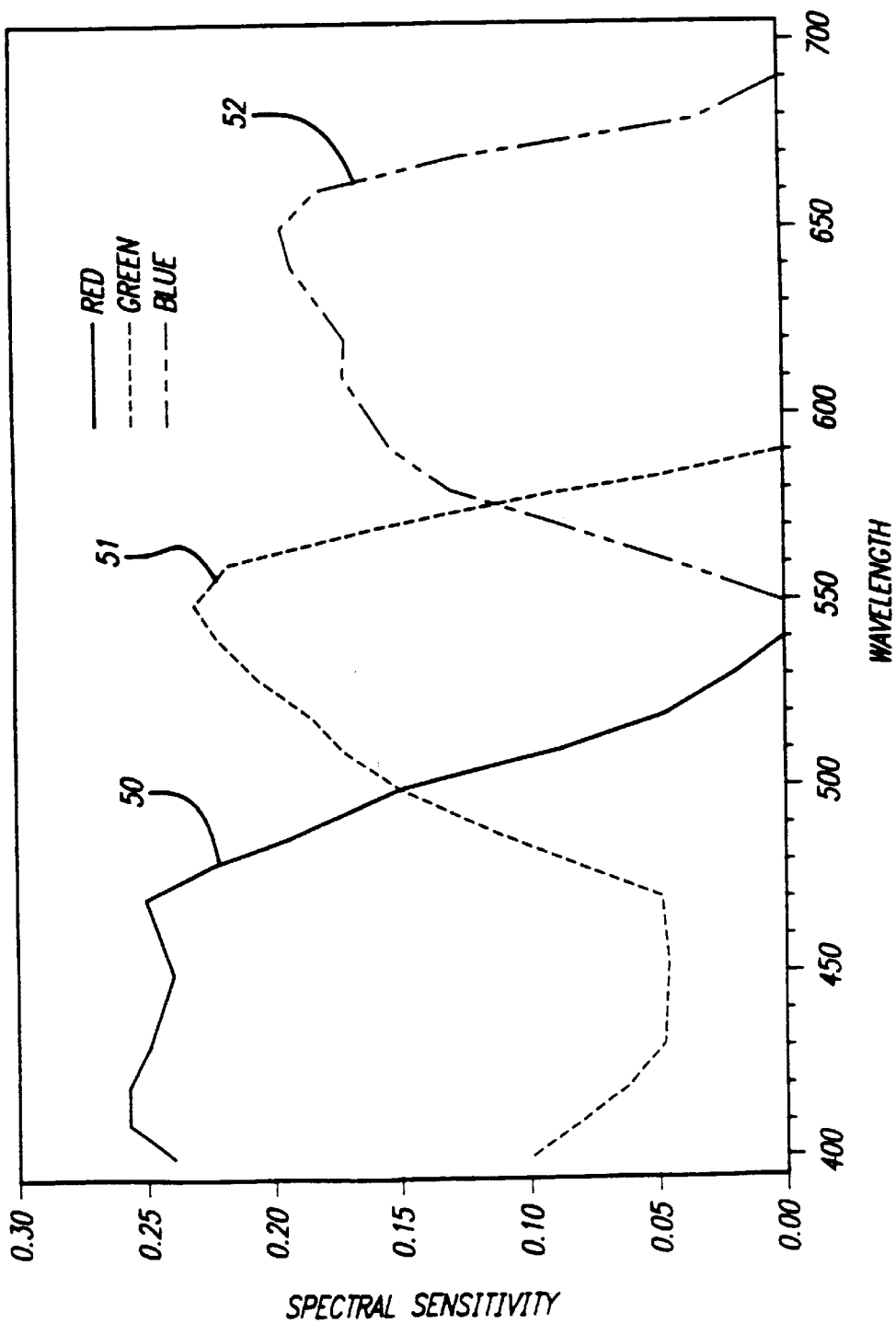
FIG. 5 is a graph showing the spectral sensitivity curves for Red, Green and Blue of a color negative.
Figure 6:
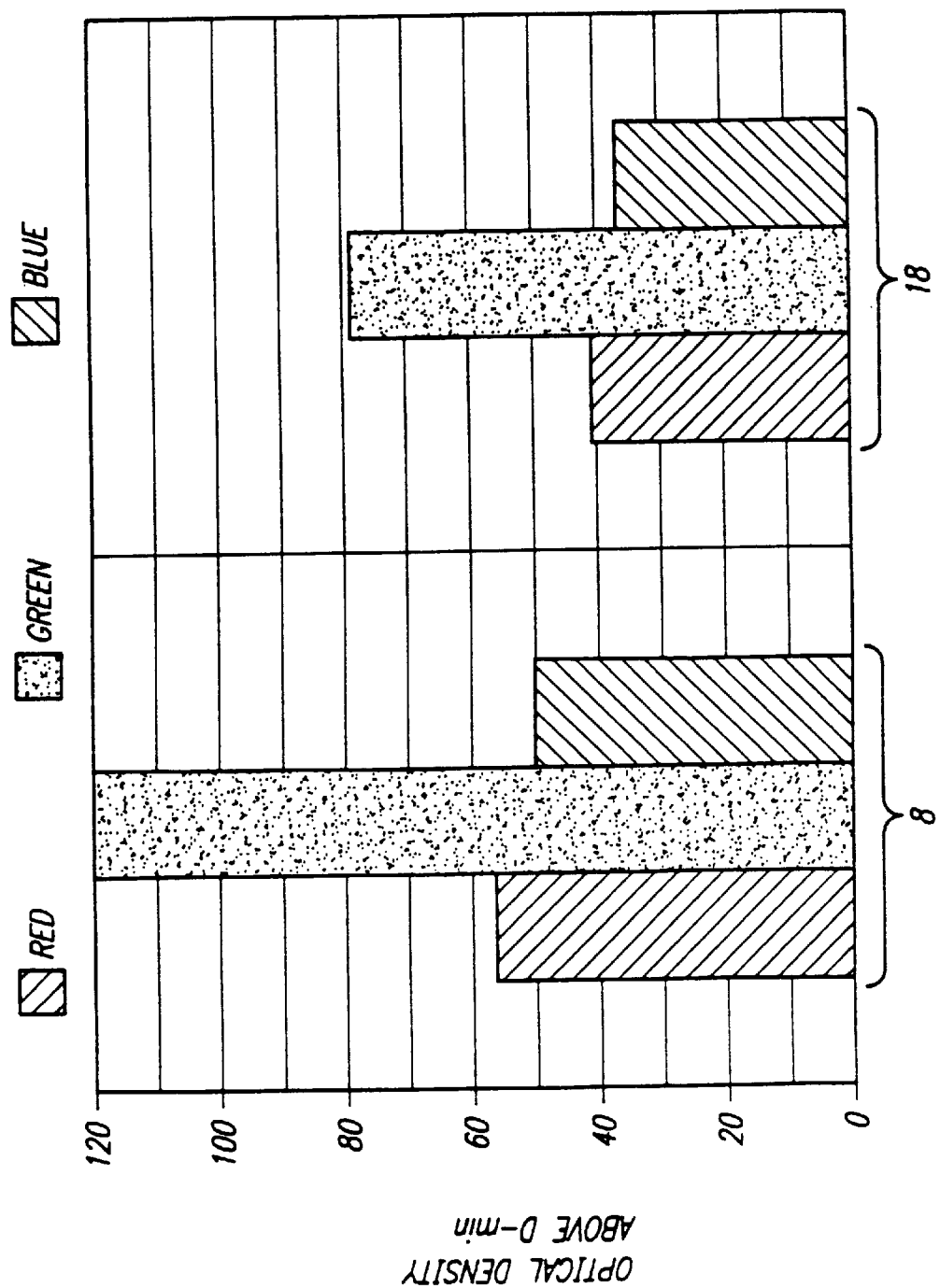
FIG. 6 is a graph comparing the optical densities above D-min for a negative exposed using a matte backing of the present invention and an industry standard matte backing.

In accordance with the process of traveling matte photography, the backing screen is photographed with a photographic film such as Eastman Kodak color negative EC 5293 having spectral sensitivity curves for Red (curve 50), Green (curve 51) and Blue (curve 52) illustrated in FIG. 5. The developed negative subsequently exhibits above D-min values illustrated in FIG. 6, graph 8. By comparison, the industry standard backing material, "Tempo" Green, having the spectral reflectance trace illustrated in FIG. 4A, curve 17a, when photographed with Eastman Kodak color negative film 5293 of illustration FIG. 5, the developed negative exhibits above D-min values illustrated in FIG. 6, graph 18.

Figure 7:
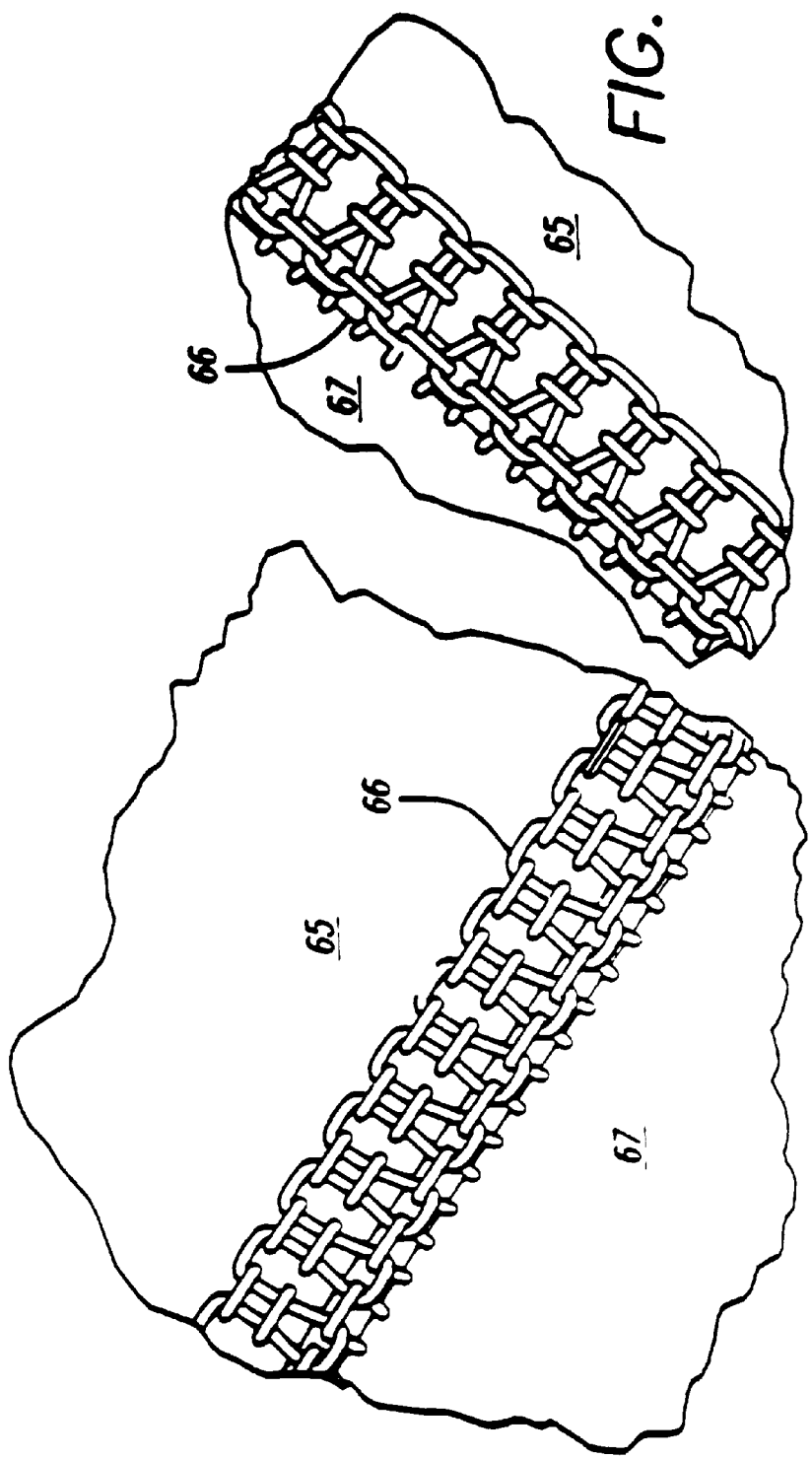
FIGS. 7A and 7B illustrate the topside and underside view of the overlock stitch implemented to joined panels of matte backing in accordance with the present invention.

Referring to FIGS. 7A and 7B, the matte fabric, which is produced as an eight foot wide bolt, is sewn into large panels 65, 67 as required, by methods known to the textile industry and, in one preferred embodiment, utilizing an overlock sewing machine. The stitch 66 thus obtained retains the stretchable capability in the seamed fabric. The threads used should be dyed with the same dye used for the panels.

The fabric panel is then mounted into a rigid frame of the type commonly used in the motion picture and photographic industries and usually constructed of tubular aluminum in a square or rectangular configuration. In the preferred embodiment, the frame provided is approximately 10% larger than the fabric panel to permit the fabric to be stretched to a taught, flat and wrinkle free condition.

Figure 8:
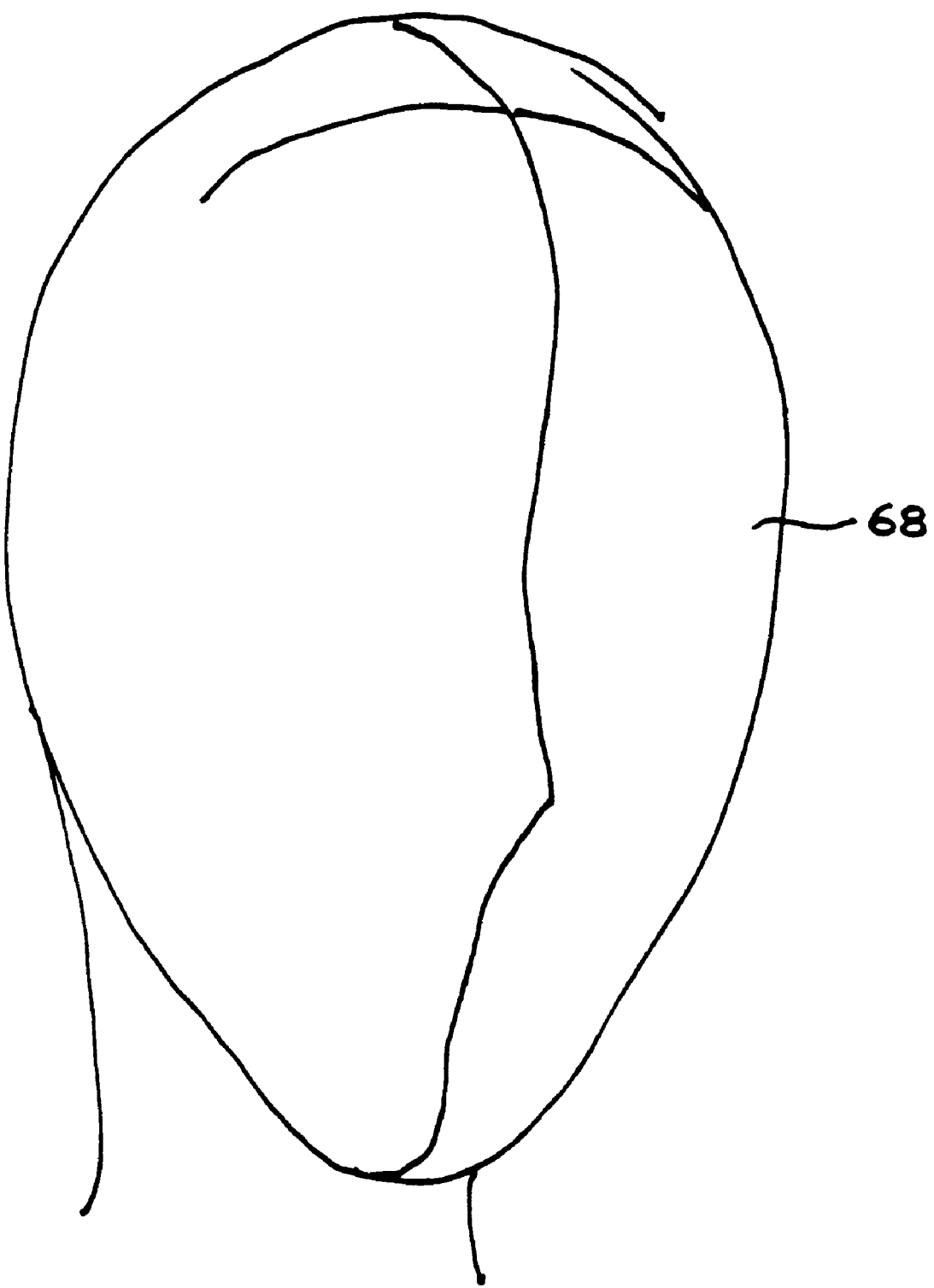
FIG. 8 illustrates configuring the matte fabric of the present invention to be worn on a part of a person.

Referring now to FIG. 8, another embodiment is illustrated in which the matte fabric is sewn into a form fitting garment 68 (in this case for a human head) whereby the wearer may be "matted."

Daylight performance:

A major difficulty is encountered when attempting to produce traveling matte elements in natural daylight with conventional backing materials, since the backing illumination and the foreground illumination are of the same source and intensity. The conventional materials currently in use provide too low a reflectance, together with insufficient chrominance, to produce an optimum exposure in the matte field. The situation is exacerbated if it is also desired to hold shadows in the matte field, as these will be two or more stops lower in intensity than the "key" lit areas. The matte signal produced is then dangerously weak and requires greater amplification. This combined with the increased grain of the reduced exposure results in a "noisy" matte signal. The traditional solution has been to provide either additional lighting for the backing or to reduce the light on the foreground subject by rigging "silks" or other light attenuating materials, in either case adding time and expense to the whole procedure. The two stop advantage provided by the present invention provides for clean, quiet matte signals in both the key lit and shadow areas of the matte field.

Figure 9:
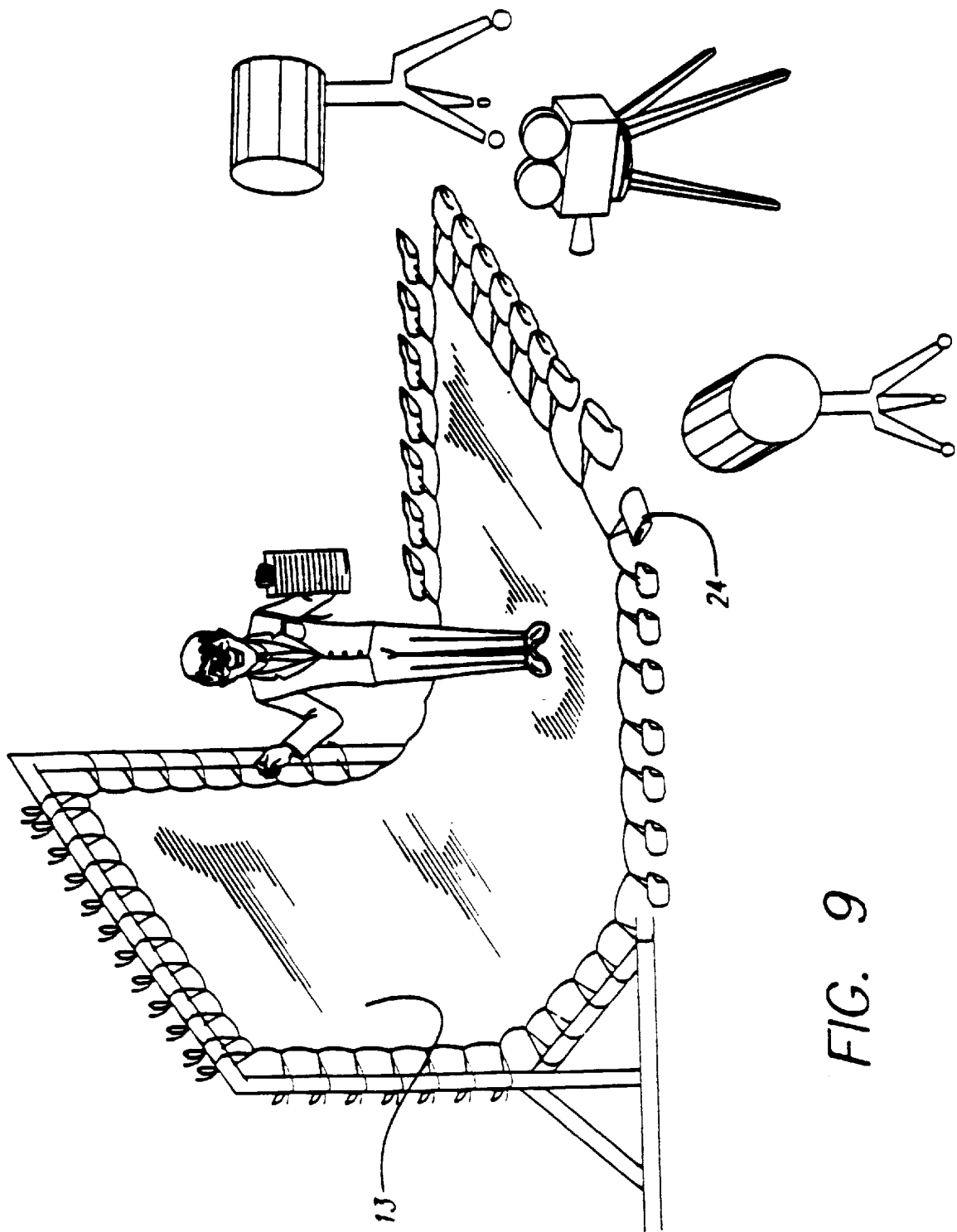
FIG. 9 illustrates the set up in which the matte backing of the present invention may be deployed to cover a floor.

Floor (or limbo) mattes:

Problems similar to the day exterior situation above described are encountered for floor, or limbo mattes. This entails matting a subject actually standing on, or otherwise in contact with the backing material. Here again both the backing and the subject will be lit to the same value, and the conventional material's insufficient reflectance values will create the problems as described above for the daylight exterior circumstance. FIG. 9 illustrates the present invention deployed as a vertical backing screen 13 coved onto the stage floor so as to provide a "limbo" backing. Sandbags 24 secure the perimeter of that section of the screen 13 that covers the floor. If the sandbags 24 will be in the field of view (e.g., with the sandbags positioned on the screen 13), they are covered with the matte fabric of the present invention.

Figure 10:
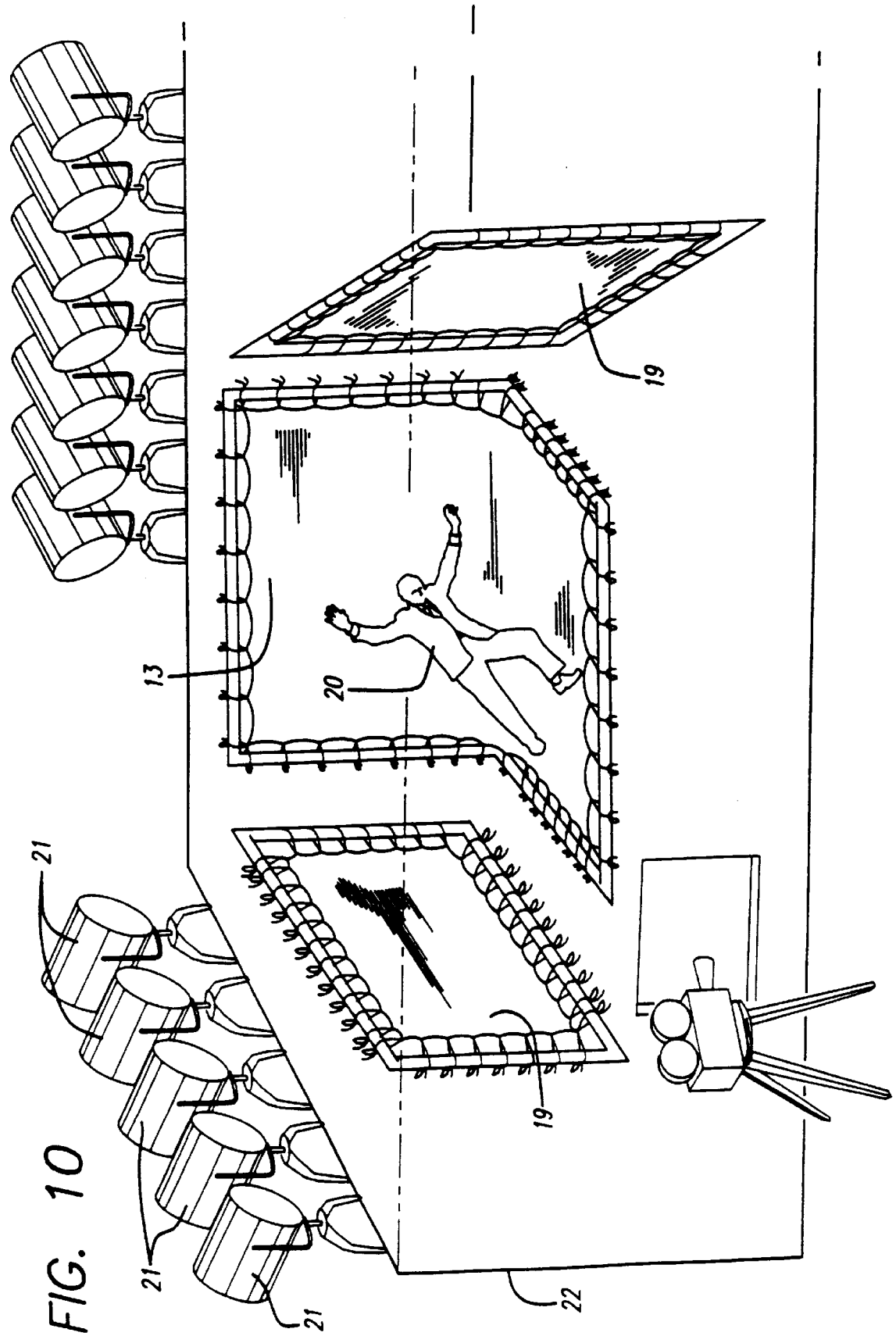
FIG. 10 illustrates the use of several matte panels of the present invention having different fluorescence characteristics to obtain the desired lighting effect in underwater photography.

Underwater performance:

In another embodiment, the unique properties of the fluorescent dyed fabric of the present invention can be exploited to provide effective means for underwater traveling matte photography. One of the central problems in underwater photography is that the longer wavelengths of light (and to a lesser extent the short) are absorbed in water at a far greater rate than are the medium wavelengths. Thus cyan light transmits quite well, while red light is absorbed to a severe degree with violet affected also. One skilled in the art is familiar with the photographic result of this function in the overall bluish green appearance of underwater photography. (An excellent paper on this subject by Tuckerman Biays is to be found in the *S.M.P.T.E. Journal,* Vol. 94, No. 3, Mar. 1985.) The present invention solves much of this problem by exploiting the energy conversion properties of fluorescent dyes. A greenscreen 13 of the present invention, as illustrated in FIG. 10, will absorb cyan light and re-emit it as green light. Additionally, redscreens 19 of the present invention can be employed as reflectors to enhance the red component of the light illuminating the foreground subject 20. Thus, white light 21 entering the tank 22 of water from above the water is progressively deprived of its red component by absorption by the water in the tank until it reaches the red screen material. The now predominantly blue-green light is then absorbed by the fluorescent dyes in the red-screen 19 and converted to red light. The emitted red light is, of course, attenuated to some degree en route from the screen 19 to the subject 20 and the resultant light reflected from the subject to the camera more nearly approaches a normal color spectrum.

Figure 11:
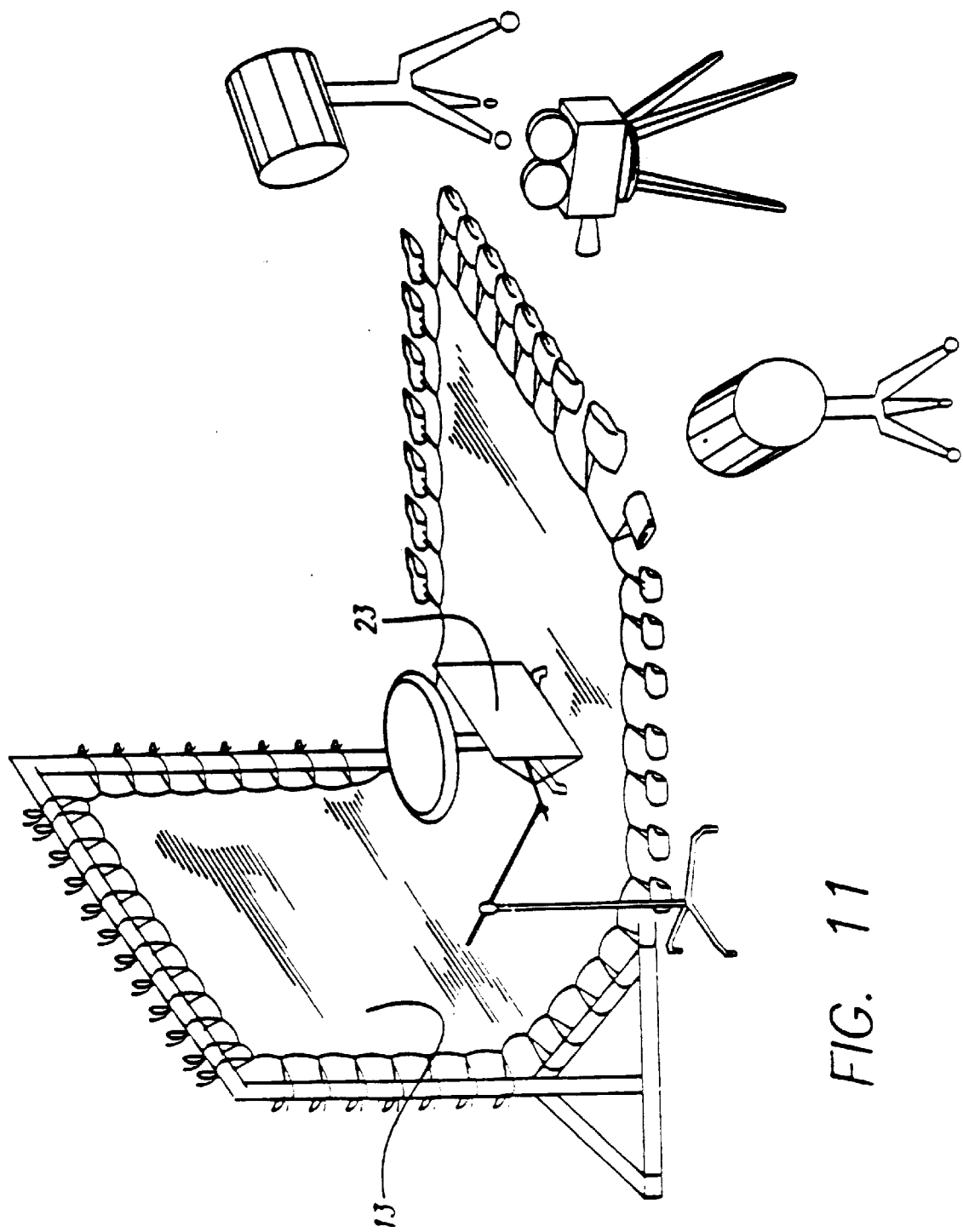
FIG. 11 illustrates configuring the matte fabric of the present invention to cover objects in a field of view.

Flags:

Referring now to FIG. 11 yet another embodiment is illustrated, in which the backing screens of the present invention can be provided as a slip cover for the conventional "flags" used in photography as well as other pieces of photographic equipment such as sand bags, light stands and even as "sleeves" for cables used for suspending actors or as safety harness. Such conventional flags are typically a construction of a steel rod framework onto which is usually sewn a black fabric so as to create a lightweight flat black panel for obscuring unwanted objects. Ordinarily such flags are used to block unwanted light falling into an area in the camera's field of view and thus the flag itself would not normally ever be seen by the camera. However, in the present invention, the flags 23 are intentionally used within the field of view to provide a matting field in place of the unwanted object which may be a piece of lighting equipment, or a support for an object that will eventually appear to be levitated in the air. In the latter case, footage may be acquired during a separate "take" in which the background scene only is filmed. Subsequently in another take, the object desired to be levitated is placed in the field of view and supported as appropriate. The "flag" of matting material is then placed between the support structure and the camera such that the structure is obscured. In subsequent compositing processes, the "flag" generates a matte signal and this is then used to replace the "flag" in the image with the corresponding portion of the previously filmed background scene. Likewise, referring now to FIG. 8, either portions or an entire human body may be covered with a closely form fitting suit fabricated of the matte backing material of the present invention, and thus said portions or body may be matted out of a scene. Among the effects that may be thus achieved would be the appearance of an apparition of human form which may be essentially transparent, but yet retains sufficient shadow details as to reveal that there is such a form present. Or the form may be revealed as a specular reflecting object such as glass or water by the expedient of "mapping" reflections of the surrounding scene onto such a character by methods known to the computer graphic special effect arts.

Thus a backing screen has been disclosed having particular use in composite photography including a biaxially stretchable fabric treated with a dye formulation including fluorescence to achieve a specific color space coordinate, for the purpose of providing a precise chromatic actinic stimulus response for silver halide photographic film, or similar response for electronic imaging devices.

While the present invention has been described with reference to FIGS. 1 through 11, it should be understood that the figures are for illustration only, and should not be taken as limitations on the invention. It is contemplated that many changes and modifications may be made by one of ordinary skill in the art, to the materials and arrangements of elements disclosed without departing from the spirit and scope of the invention. For example, films other than EC 5293 and having different spectral sensitivities may necessitate shifts in the optimal chrominance specifications of the dyes to achieve an optimal exposure. Those of skill in the art will recognize from the foregoing description how to derive the new optimal specifications. Moreover, those of skill in the fabric dying art will recognize from the foregoing description how to derive the new optimal specifications. Those of skill in the fabric dying art will be able to alter the formulation of the dye mixtures to account for any such shifts in the optimal chrominance and luminance specifications.

What is claimed is:

1. A matte process for composite photography utilizing a color difference process comprising the steps of:

providing a matte backing which comprises a fabric material treated with a dye formulation including fluorescence which is reactive to illumination within visible spectrum to achieve a spectral emission of a desired color and luminance for providing a desired actinic stimulus to an image recording medium, wherein the matte backing exhibits a spectral characteristic substantially corresponding to one of the optimal spectral loci of FIG. 1, so as to provide a chromatic actinic stimulus response optimal for the imaging recording medium;

illuminating a foreground subject with a visible spectrum illuminant with the matte backing in place;

exposing an image recording medium to the foreground subject and matte backing to form a representation of an image; and forming a matte from said representation of said image.

2. The matte process as in claim 1 wherein the dye formulation is so formulated such that a negative that has exposure characteristics substantially similar to that of a Kodak EC 5293 negative, when exposed with the matte backing, exhibits relative optical densities in the negative substantially corresponding to one of the sets of bar graphs in FIG. 2.

3. The matte process as in claim 1 wherein the dye formulation comprises a first dye containing a first phosphor which is reactive to illumination within visible spectrum and having a dominant emission of a first wavelength within the visible spectrum.

4. The matte process as in claim 3 wherein the dye formulation further comprises an absorption dye which absorbs certain fluorescent emission from said first phosphor.

5. The matte process as in claim 4 wherein the fabric material is treated with the dye formulation to form a green matte, and wherein the first dye is Alberta Yellow dye and the absorption dye is phthalocyanine green dye.

6. The matte process as in claim 4 wherein the absorption dye comprises a second dye containing a second phosphor which is reactive to illumination within the visible spectrum and having a dominant emission of a second wavelength within the visible spectrum, and an adsorption dye which absorbs certain fluorescent emission from said first phosphor, wherein said second dye fluoresces in part by stimulus of the emission from the first phosphor.

7. The matte process as in claim 6 wherein the absorption dye comprises a third dye containing a third phosphor which is reactive to illumination within the visible spectrum and having a dominant emission of a third wavelength within the visible spectrum, wherein said third dye fluoresces in part by stimulus of the emission from the first and/or second phosphor.

8. The matte process as in claim 7 wherein the fabric material is treated with the dye formulation to form a red matte, and wherein the first dye is Alberta Yellow dye, the second dye is Rhodamine F5G dye and the third dye is Rhodamine B.

9. A matte process for composite photography utilizing a color difference process comprising the steps of:

positioning a matte material in a scene, said matte material treated with a dye formulation including fluorescence which is reactive to illumination within visible spectrum to achieve a spectral emission of a desired color and luminance for providing a desired actinic stimulus to an image recording medium, wherein the matte material exhibits a spectral characteristic substantially corresponding to one of the optimal spectral loci of FIG. 1, so as to provide a chromatic actinic stimulus response optimal for the imaging recording medium;

illuminating the scene with a visible spectrum illuminant with the matte material in place;

exposing an image recording medium to the scene and matte material to represent an image; and forming a matte from said representation of said image.

10. The matter process as in claim 9 wherein the dye formulation is so formulated such that a negative that has exposure characteristics substantially similar to that of a Kodak EC 5293 negative, when exposed with the matte material, exhibits relative optical densities in the negative substantially corresponding to one of the sets of bar graphs in FIG. 2.

11. The matte process as in claim 9 wherein the dye formulation comprises a first dye containing a first phosphor which is reactive to illumination within visible spectrum and having a dominant emission of a first wavelength within the visible spectrum.

12. The matte process as in claim 11 wherein the dye formulation further comprises an absorption dye which absorbs certain fluorescent emission from said first phosphor.

13. The matte process as in claim 12 wherein the matte material is treated with the dye formulation to form a green matte, and wherein the first dye is Alberta Yellow dye and the absorption dye is phthalocyanine green dye.

14. The matte process as in claim 12 wherein the absorption dye comprises a second dye containing a second phosphor which is reactive to illumination within the visible spectrum and having a dominant emission of a second wavelength within the visible spectrum, and an absorption dye which absorbs certain fluorescent emission from said first phosphor, wherein said second dye fluoresces in part by stimulus of the emission from the first phosphor.

15. The matte process as in claim 14 wherein the absorption dye comprises a third dye containing a third phosphor which is reactive to illumination within the visible spectrum and having a dominant emission of a third wavelength within the visible spectrum, wherein said third dye fluoresces in part by stimulus of the emission from the first and/or second phosphor.

16. The matte process as in claim 15 wherein the matte material is treated with the dye formulation to form a red matte, and wherein the first dye is Alberta Yellow dye, the second dye is Rhodamine F5G dye and the third dye is Rhodamine B.

17. A matte process for composite photography utilizing a color difference process comprising the steps of:

covering an object in a scene with a matte material which comprises a dye formulation including fluorescence which is reactive to illumination within visible spectrum to achieve a spectral emission of a desired color and luminance for providing a desired actinic stimulus to an image recording medium, wherein the matte material exhibits a spectral characteristic substantially corresponding to one of the optimal spectral loci of FIG. 1, so as to provide a chromatic actinic stimulus response optimal for the imaging recording medium;

illuminating the scene with a visible spectrum illuminant with the matte material in place;

exposing an image recording medium to the scene and matte material to form a representation of an image; and forming a matte from said representation of said image.

18. The matte process as in claim 17 wherein the matte material includes a fabric and/or dye.

* * * * *